J. B. & O. R. ERWIN.
APPARATUS FOR EXTINGUISHING FIRES.
APPLICATION FILED NOV. 7, 1914.

1,128,768.

Patented Feb. 16, 1915.
5 SHEETS—SHEET 1.

Witnesses
J. J. Bremer
A. J. McKerlan

Inventors
James B. Erwin
Orlando R. Erwin
By Erwin & Wheeler
Attorneys

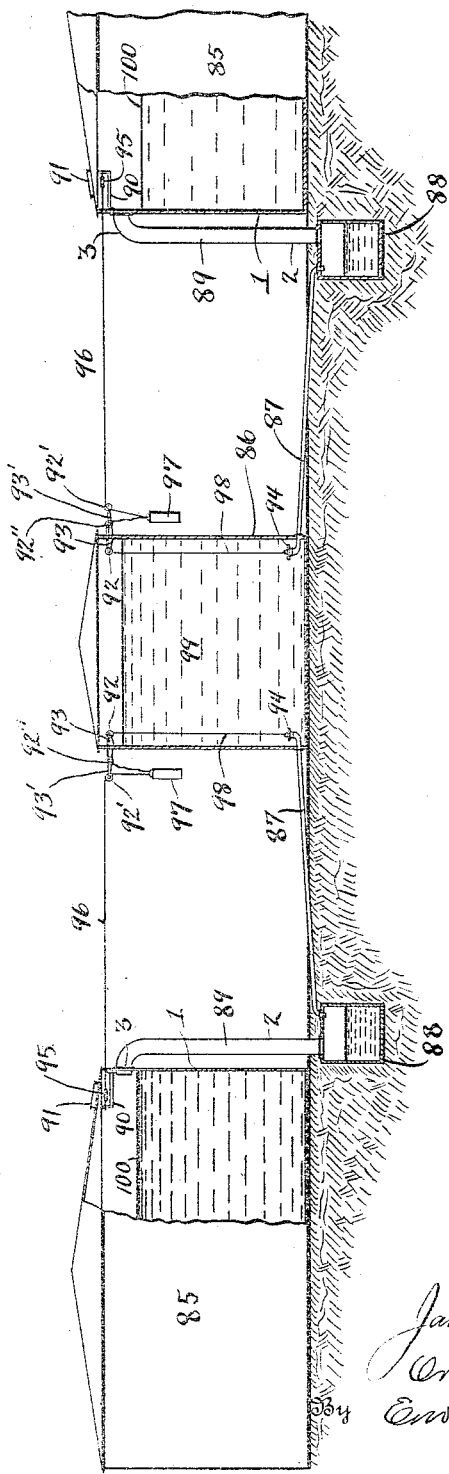

UNITED STATES PATENT OFFICE.

JAMES B. ERWIN AND ORLANDO R. ERWIN, OF MILWAUKEE, WISCONSIN.

APPARATUS FOR EXTINGUISHING FIRES.

1,128,768.  Specification of Letters Patent.  Patented Feb. 16, 1915.

Application filed November 7, 1914. Serial No. 870,730.

*To all whom it may concern:*

Be it known that we, JAMES B. ERWIN and ORLANDO R. ERWIN, citizens of the United States, residing at the city of Milwaukee, county of Milwaukee, and State of Wisconsin, have invented new and useful Improvements in Apparatus for Extinguishing Fires, of which the following is a specification.

Our invention relates to improvements in apparatus for simultaneously generating and discharging foam upon burning surfaces, and it pertains to that class of devices shown and described in Letters Patent of the United States, No. 1,085,805, which was issued to us February 3rd, 1914, said patent being for the method of extinguishing fires, with foam.

Our apparatus, consists in the mechanism for commingling foam producing ingredients and the delivery of such foam more rapidly than heretofore, upon a burning surface.

A further object of our invention is to dispense with the use of pumps or other equivalent devices for producing and discharging a foam upon a burning surface. With our device the foam produced rises automatically and is discharged direct by its own inherent expansion upon the fire, in greater volume and velocity than by any other system of devices which has heretofore been disclosed.

Our invention is further explained by reference to the accompanying drawings, in which—

Figure 1:
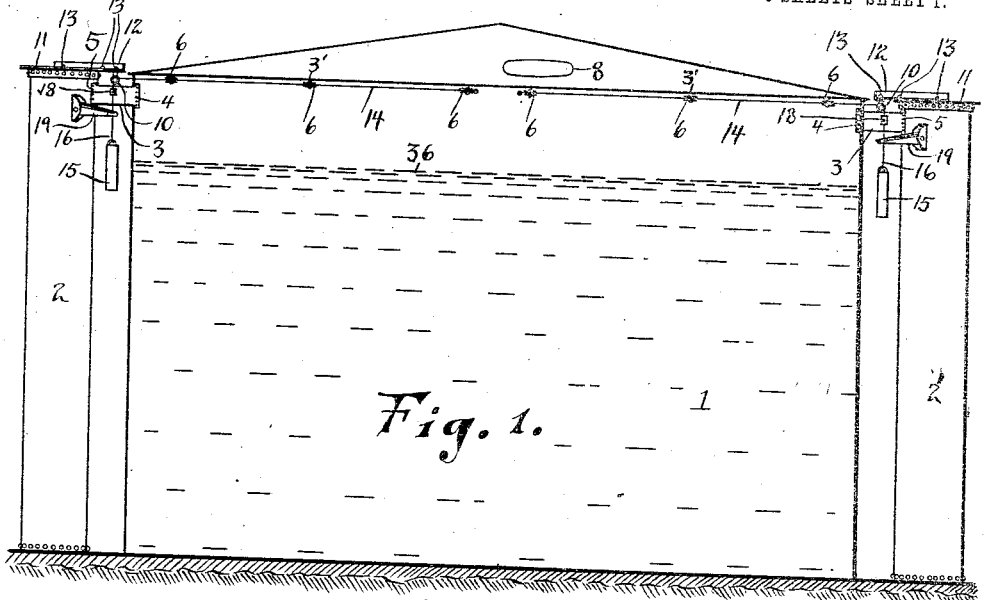
Figure 2:
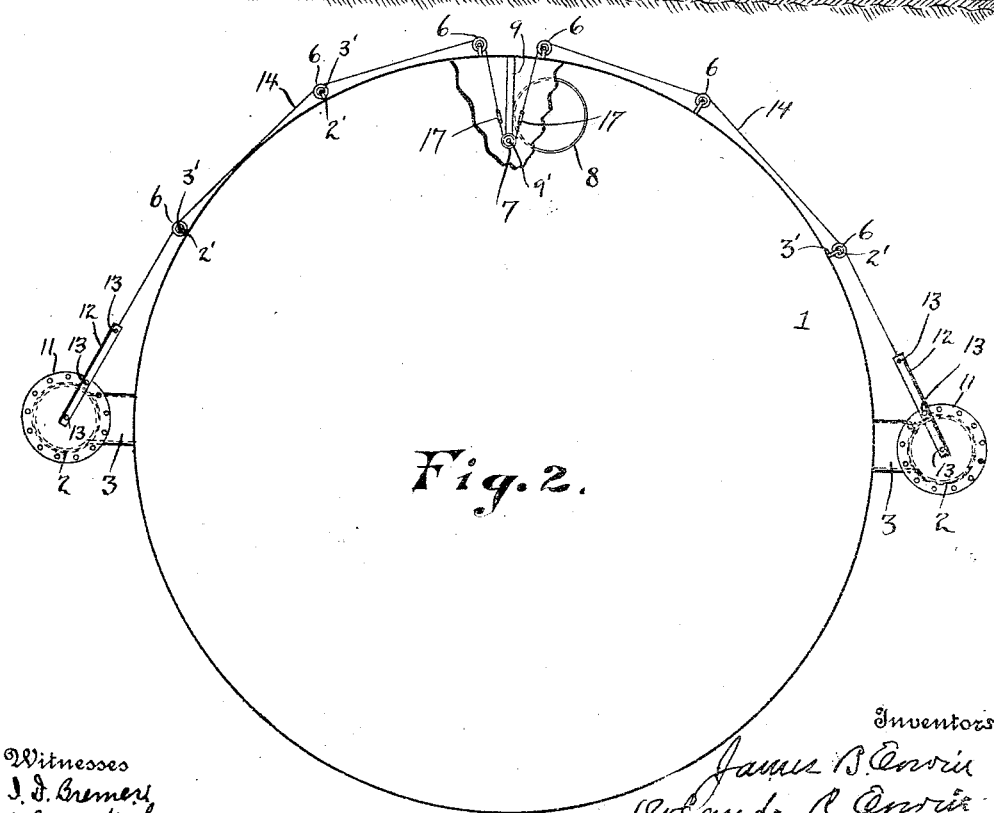
Figure 5:
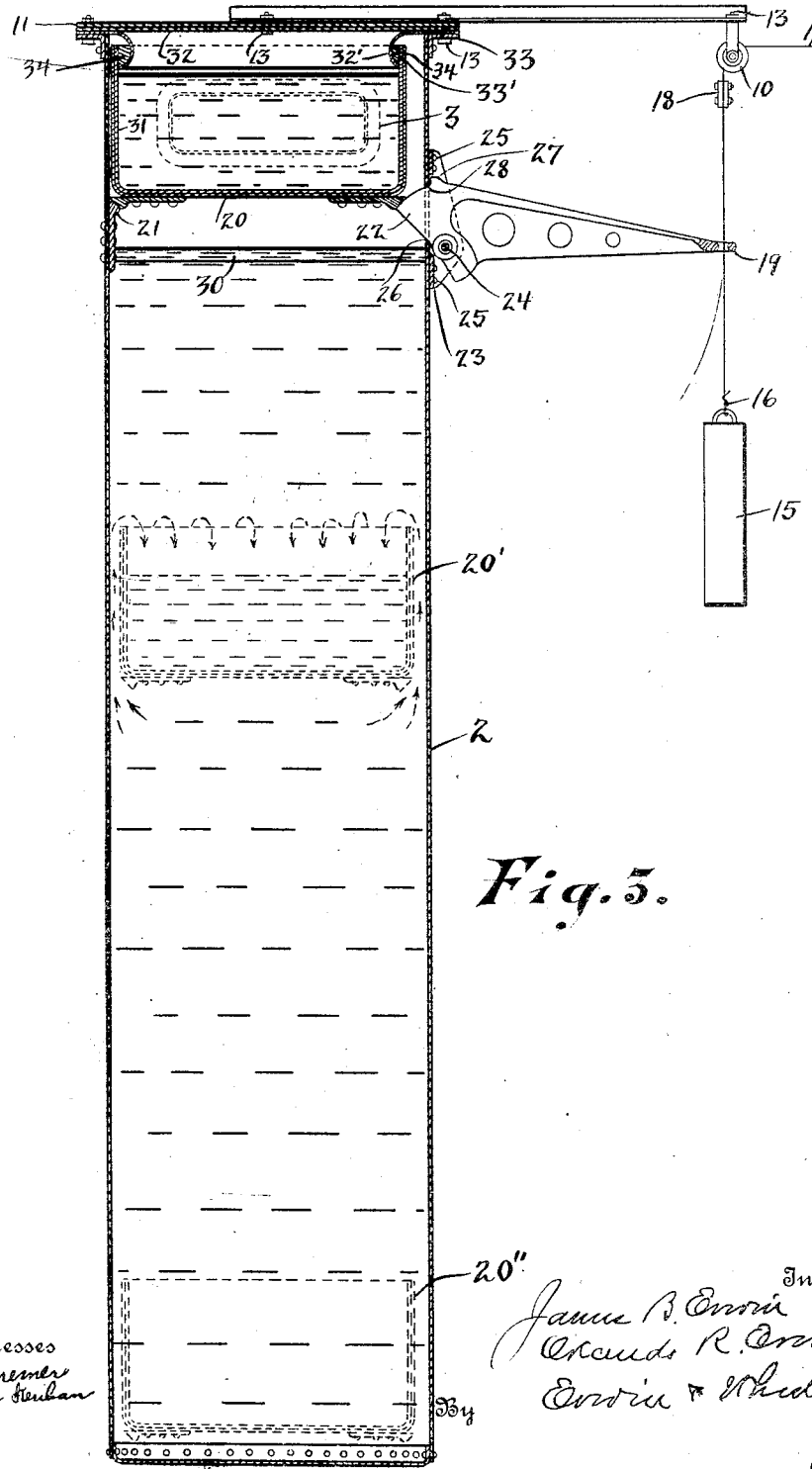
Figure 4:
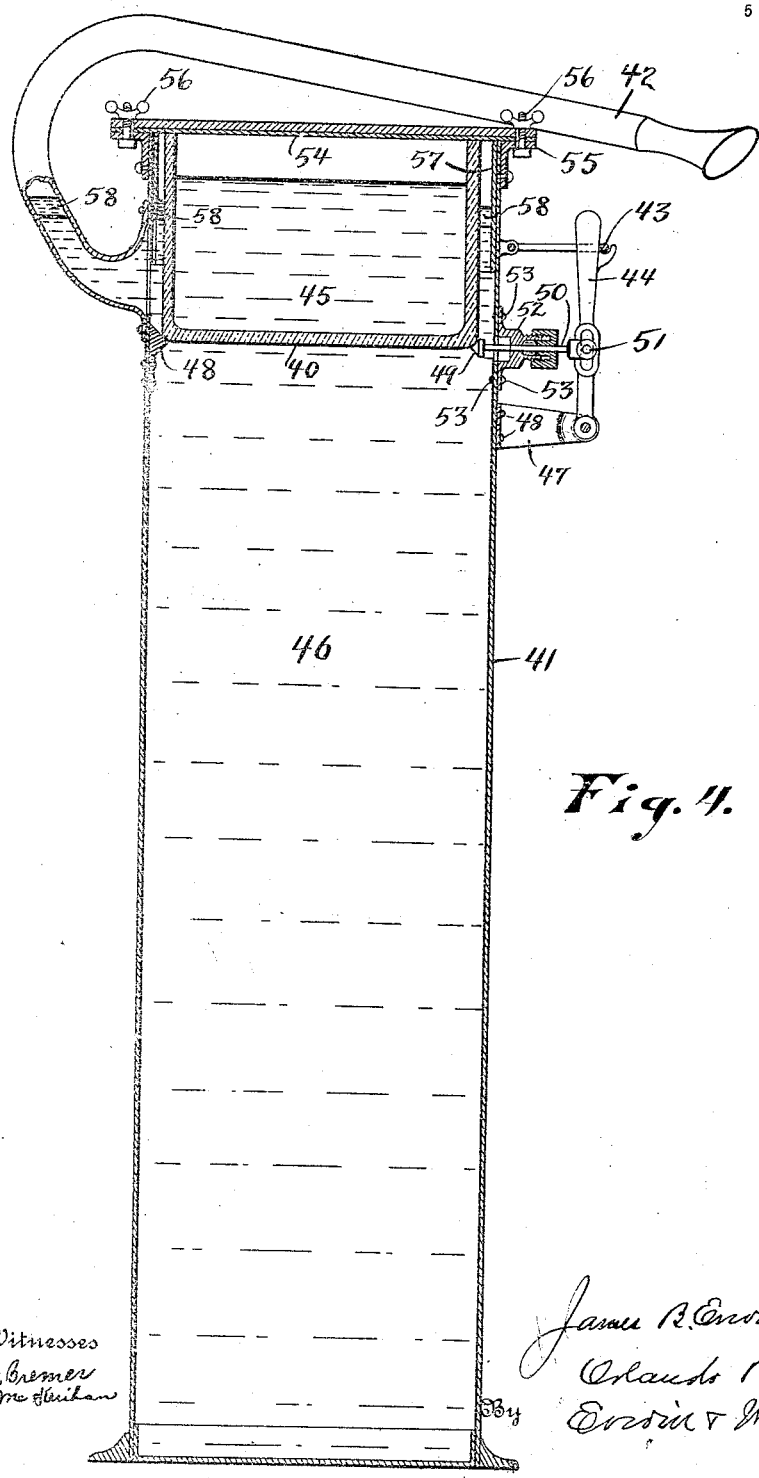
Figure 5:
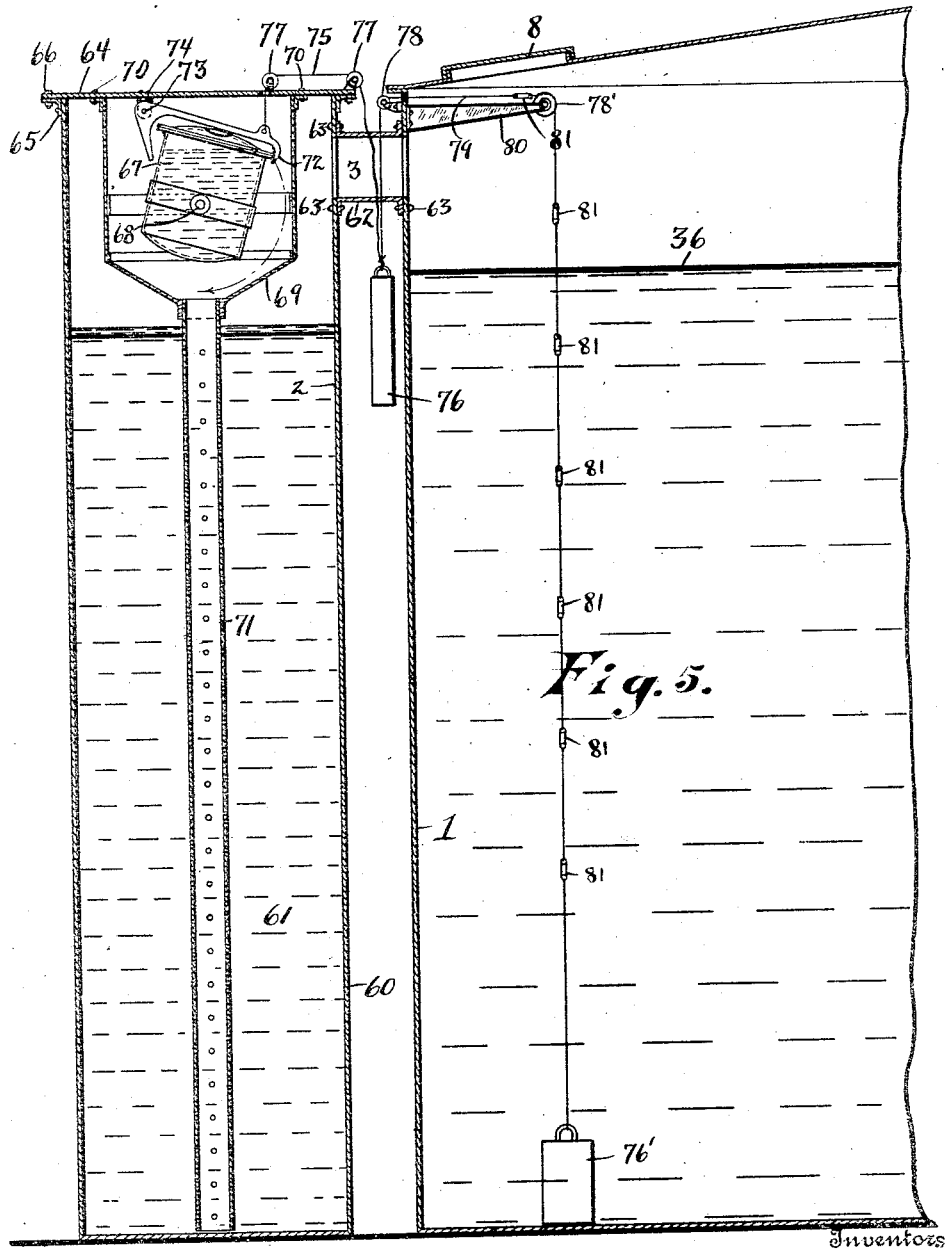

Figure 1 is a side view of an ordinary oil storage tank, showing two of our automatic instantaneous foam producing extinguishers in operative connection therewith. Fig. 2 is a plan view of the apparatus shown in Fig. 1. Fig. 3 is an enlarged vertical sectional view of one of the extinguishers shown in Fig. 1. Fig. 4 is a vertical sectional view of a modified form of the extinguisher, adapted to be manually operated. Fig. 5 is a modified form of our foam producing apparatus, also in vertical section, and Fig. 6 represents vertical sections of several chemical reservoirs in connection with two separate oil tanks, part in vertical section.

1 is an oil tank of ordinary construction. 2, 2 are stand-pipes. The stand-pipes 2 are connected with the tank 1, by means of the spouts 3 and bolts 4 and 5. A series of pulleys 6 are connected with the top of the oil tank, by brackets 2' and pins 3' and a pulley 7 is supported inside the tank near the man-hole 8 by means of the bracket 9 and pin 9'. Pulleys 10, 10 are also supported in connection with the pulleys 6 and 7, from the plates 11 by means of the brackets 12, 12 and bolts 13, 13.

The pulleys 6, 7 and 10 support an operating cable 14, which in turn normally supports an actuating weight 15 at each of its free ends 16. One or more fusible links 17 are interconnected in the cable 14 between the pulleys 6 and 7, and set collars 18 are clamped to the cable 14, between the pulleys 10 and the trigger 19 of the stand-pipe 2.

Referring to Fig. 3, an acid receptacle 20, normally rests at one side upon the stationary bracket 21 and at its opposite side upon the short arm 22 of the trigger 19. The trigger 19 is connected with the vertical wall of the stand-pipe 2 by means of the bracket 23, and pivotal bolt 24, and the short arm 22 of the trigger 19 projects through a slot 26 in said vertical wall. The trigger 19 is normally held in an operative horizontal position by means of the weight of the acid receptacle resting on its short arm and by means of the lug 27 contacting with the stand-pipe 2 at 28. The stand-pipe 2 is preferably filled with a saponaceous alkaline solution, such solution being usually composed of water, soap bark and bicarbonate of soda. 30 is an acid-and-alkaline proof seal which consists of a heavy paraffin oil as the main ingredient. The acid receptacle 20 is preferably provided with lead lining 31, and the top plate 11 is also similarly lined at 32. Further a lead gasket 32' is interposed as a packing between its flange 33 of the stand-pipe and the top plate 11. This gasket 32' projects, as shown, downwardly and into the acid receptacle 20, and forms a channel 33' into which the acid proof material 34 is placed to prevent injurious action of the acid fumes on the various parts of the apparatus.

Referring again to Figs. 1 and 2, a fire occurring in the tank 1, melts one or more of the fusible links 17, when the weights 15 are simultaneously free to drop together with the set collars 18, shown in Fig. 3, thereto connected by cable 14, when said triggers 19, 19 are moved downwardly, disengaging their short arms 22 from beneath said acid receptacles 20, whereby said acid receptacles are free to drop and gradually descend into said saponaceous alkaline solution below, whereby a thick blanket of durable foam is continuously generated throughout the descent of said acid receptacle, and discharged by its own expansion direct through the spout 3, upon the burning oil surface 36, when it flows all over such surface and thereby extinguishes all fires in the tank.

The descending acid receptacle 20 is shown in dotted lines at 20' and 20''. 20'' shows the final position of the acid receptacle in its descent in the stand-pipe 2.

Experience has demonstrated that for the best result the acid-and-alkaline solution must be gradually commingled. By the device shown in Fig. 3 the tank 20 can only descend as fast as the fluid in the stand-pipe 2 passes through the space between said tank and stand-pipe, when it flows over into said tank, as indicated by dotted lines 20'.

By the device shown in Fig. 5 the acid is led to the alkaline solution through a perforated pipe 71 by which it is also gradually and more thoroughly commingled with such solution. By thus gradually commingling the two solutions they become more thoroughly mixed and their efficiency is greatly increased.

Fig. 4 is a modified portable form of our foam producing device similar in construction and operation to that shown in Fig. 3. This device is likewise intended primarily for extinguishing oil fires with saponaceous foam of less areas than those of large oil storage tanks, etc.

To operate the device shown in Fig. 4, the flexible spout 42 is manually directed toward the burning area, the pivotal latch 43 is raised, and the hand-lever 44 is drawn toward the right or away from the receptacle 41, whereby the receptacle 40, together with its contents of acid 45 begins its descent into the saponaceous alkaline solution 46 below, which solution is rapidly discharged into the acid, a perfect commingling is effected and a thick durable foam rises and discharges itself direct by its own inherent expansion from said receptacle 41 to the burning area through said spout. The lever 44 is pivotally supported in the bracket 47, which is connected to the receptacle 41 by rivets 48. The acid receptacle 40 normally rests at one side upon the stationary lug 48 and at its opposite side upon the movable support 49, which latter is operatively connected through the rod 50 and fork 51 with the lever 44, and said rod is mounted in a bracket 52 connected to the receptacle 41 by rivets 53, as shown. The acid receptacle 40 is preferably made of glass in the smaller sizes of devices and the fumes arising from the acid are prevented from escaping by means of the lead gasket 54, which is connected to the flange 55 of the receptacle 41, through the bolts 56. The upper inside wall of the receptacle 41 is lined to a sufficient depth with sheet-lead 57, and a seal 58 interposed between such glass receptacle 40 and lead lining 57.

Fig. 5 is a further modified form of device for the commingling of the liquids from that shown in Figs. 3 and 4. Connected with the oil tank 1 is a stand-pipe 60 which stand-pipe is filled with our saponaceous alkaline solution 61. The stand-pipe 60 is directly connected to the oil tank 1 by means of the open spout 62, which spout is secured at one end to the oil tank and at its other end to the stand-pipe by means of the rivets 63. The stand-pipe 60 is closed at its upper end by means of the plate 64, which is bolted to the flange 65 of the stand-pipe 60 by bolts 66. An acid receptacle 67 is pivotally mounted below its center of gravity and in an inclined position, upon trunnions 68 operating in the closed funnel 69, which funnel is secured, as shown, to the plate 64 by bolts 70. A perforated pipe 71 is connected to the lower end of the funnel 69 and extends to the bottom of the stand-pipe 60. The acid receptacle 67 is normally held in its inclined position shown in Fig. 5 by the latch 72, which latch is pivoted at 73 to the top plate 64 of the stand-pipe 60 through the bracket 74. A cable 75 connects the latch 72 with the weight 76 operating over the pulleys 77. Another cable 79, likewise attached to the weight 76, extends over the tank pulley 78 into the oil tank, and thence over the pulley 78' and from thence to the bottom of the tank 1. The cable 79 is preferably provided with a plurality of fusible links 81, located at short intervals apart, whereby one of such links will be near the surface of the burning oil, regardless of the depth of oil in said tank when ignited. The lower end of the cable 79 is preferably attached to a weight 76', the gravity of which is greater than that of the weight 76. The bracket 80 is supported from the vertical wall of the oil tank near the top. In case of a fire one of the fusible links 81 melts permitting said weight 76 to drop, whereby the acid receptacle 67 is inverted, the descending weight 76 acting through the cable 75 releasing latch 72, whereby said acid will be discharged into the perforated funnel pipe 71, whereby a commingling of the two liquids is effected, and whereby a saponaceous foam is generated, which is utilized as heretofore described.

Referring to Fig. 6, 85, 85 represent a plurality of oil storage tanks connected with a modified form of our apparatus to be used where there are a number of oil storage tanks in close proximity. A storage receptacle 86 for the most voluminous of our fire extinguishing ingredients is located centrally of the oil tank 85, 85 and has suffi cient capacity for more than one tank. The receptacle 86 is connected through discharge pipes 87, 87 with other storage receptacles 88, 88 located in close proximity to said oil tanks, said receptacles 88, 88 being at a lower level with respect to said first named receptacle 86. Risers 89, 89 connect each of the receptacles 88, 88 with the top of the oil tanks 85, 85. Cable supporting brackets 90, 90 are bolted to the vertical wall of each of said oil tanks, near the man-holes 91, 91. The receptacle 86 is provided with cable supporting pulleys 92, 92 and brackets 93 therefore, also cable supporting pulleys 92', 92' and brackets 93' therefore, which brackets are bolted near the top of the tank 86, as shown.

The discharge or mixing pipes 87, 87 are preferably provided with lift valves 94, 94 at their inner ends, to control the escape of the fluid from the receptacle 86.

In case of fire occurring in any of the tanks 85 a fusible link 95, connected in the operating cable 96 therein, fuses permitting the weight 97 to drop, when the valve 94 is raised through the attached cable 98, also in connection with said weight 97, said second cable 98 passing over pulleys 92, 92", whereby a portion of the saponaceous alkaline solution 99 flows out by its own gravity into the receptacle 88, which preferably contains an acid, like sulfuric, whereby a durable foam will be automatically and rapidly generated, which will rise by its own expansion and pass out through the stand pipe 89 to and upon the surface 100 of the burning oil, spreading uniformly thereover, and extinguishing all fires thereon. As the specific gravity of the foam is less than that of the liquid in the pipe 87 the foam will rise in the stand pipe 89.

Especial attention is called to the fact that the receptacles 88, 88 are designed to hold only sufficient acid when commingling with the other solution to produce sufficient foam for the tank with which it is connected, that when such acid or other liquid in the receptacle 88 is all used up in the generation of foam, said receptacle will be filled with the solution from the receptacle 86, until the same levels of liquid in the riser 89 and receptacle 86 are reached, when no more of the liquid 99 will be discharged.

Having thus described our invention, what we claim as new and desire to secure by Letters Patent, is—

1. In a device of the described class, the combination with a structure, having an exposed surface covered with an inflammable liquid, of a plurality of storage receptacles for separately stored ingredients, adapted to be commingled in one of said receptacles, means for commingling said separately stored ingredients in one of said storage receptacles, and means for discharging a foam produced by commingling such fire extinguishing substances upon said inflammable liquid.

2. In a device of the described class, the combination with a structure having an exposed surface covered with an inflammable liquid, of a plurality of storage receptacles for separately stored ingredients, adapted to be commingled in one of said receptacles, heat controlled means in the structure having such exposed surface for automatically commingling said separately stored ingredients in one of said storage receptacles, and means for discharging the foam produced by commingling such fire extinguishing substance upon such inflammable liquid.

3. The combination with an oil tank, of a receptacle the upper portion of said receptacle being permanently connected with the upper portion of said tank in a position to permit foam to be discharged by its own expansion upon the surface of the tank contents, and means for automatically causing such ingredients to commingle under predetermined conditions of heat in said tank.

4. The combination with a container for inflammable substances, of a receptacle having an outlet leading to the upper portion of said container and otherwise substantially closed for the development of pressure in said receptacle, and means for developing a foam in said receptacle, said receptacle and its outlet being located and adapted to permit a rapid and direct discharge of such foam by its own expansion into the container.

5. The combination with a chamber, having surfaces which are covered with oil, grease or similar highly inflammable materials, of a receptacle having an outlet adapted to permit free discharge from the receptacle over such surfaces, and means for developing a foam in the receptacle; said receptacle being so located with reference to said chamber, as to permit the foam to discharge by its own expansion through said outlet and over said surfaces.

6. The combination with a chamber, having surfaces which are covered with oil, grease or similar highly inflammable materials, of a receptacle having an outlet adapted to permit free discharge from the receptacle over such surfaces, and heat controlled means for automatically developing a foam in the receptacle; said receptacle being so located with reference to said chamber, as to permit the foam to discharge by its own expansion through said outlet and over said surfaces.

7. In a device of the described class, the combination of an oil tank, a stand-pipe, a duct leading from the upper end of said stand-pipe to the upper end of said tank, an acid receptacle located in said stand-pipe, heat controlled means located in said oil tank, adapted when acted upon by heat to commingle the acid in said acid receptacle with the contents of said stand-pipe, whereby a foam is produced and automatically discharged direct by its own expansion upon the surface of the oil in said oil tank.

8. In a device of the described class, the combination of an oil tank, a stand-pipe, means for commingling foam producing ingredients in said stand-pipe, a duct leading from the upper end of said stand-pipe to the upper end of said oil tank, heat controlled means located in said oil tank for producing the initial action for commingling said foam producing ingredients, a bracket affixed to the wall of said oil tank and extending toward its center, a pulley revolubly supported from the inner end of said bracket, a weight located in the bottom of said oil tank, a flexible member supported from said pulley within said oil tank and connected at its lower end with said weight, said flexible member including a plurality of fusible links, connected at short intervals apart within said oil tank, whereby when any one of said links is fused said foam producing ingredients will be commingled and the foam produced thereby will be discharged upon the fire in said oil tank.

In testimony whereof we affix our signatures in the presence of two witnesses.

JAMES B. ERWIN.
ORLANDO R. ERWIN.

Witnesses:
ALICE J. McKERIHAN,
IRMA D. BREMER.